United States Patent [19]
Hambleton, Jr. et al.

[11] Patent Number: 5,723,834
[45] Date of Patent: Mar. 3, 1998

[54] HORN MEMBRANE SWITCH WITH RUPTURABLE STRAIN RELIEF BRIDGING CONNECTOR

[75] Inventors: Howard W. Hambleton, Jr., South Ogden, Utah; Kevin W. Booth, Mesa, Ariz.

[73] Assignee: Morton International, Inc., Chicago, Ill.

[21] Appl. No.: 752,357

[22] Filed: Nov. 19, 1996

[51] Int. Cl.⁶ .................. H01H 9/00; H01H 13/70; B60R 21/22

[52] U.S. Cl. ............... 200/61.54; 200/61.08; 280/731

[58] Field of Search .................. 200/5 A, 61.54–61.57, 200/86 R, 512–517, 61.08; 280/727–735

[56] References Cited

U.S. PATENT DOCUMENTS

| | | | |
|---|---|---|---|
| 3,668,337 | 6/1972 | Sinclair | 200/5 A |
| 3,772,776 | 11/1973 | Weisenburger | 174/177 PC X |
| 4,525,606 | 6/1985 | Sado | 200/5 A |
| 4,885,430 | 12/1989 | Kinser, Jr. et al. | 174/254 |
| 5,198,629 | 3/1993 | Hayashi et al. | 200/61.54 |
| 5,309,135 | 5/1994 | Landford | 328/211 |
| 5,399,819 | 3/1995 | Lang et al. | 200/61.54 |
| 5,576,684 | 11/1996 | Langford | 338/50 |
| 5,577,767 | 11/1996 | Nemoto | 280/731 |
| 5,585,606 | 12/1996 | Ricks | 200/61.08 |
| 5,639,114 | 6/1997 | Margetak et al. | 200/61.54 X |

*Primary Examiner*—J. R. Scott
*Attorney, Agent, or Firm*—George W. Rauchfuss, Jr.; Gerald K. White

[57] ABSTRACT

An improved membrane horn switch having a first main switch section and a second main switch section connected by spaced-apart, relatively narrow first and second bridge members which are rupturable by a force created by an inflating airbag cushion. Each bridge member has a conductive coating in the form of two spaced-apart parallel strips which resist the propagation of stress cracks caused by the bending and twisting of horn actuation, and provide redundancy upon one of the two conductive strips being severed by a stress crack. Improved membrane horn switches having strain relieving bridge members are also provided. Each strain relieving bridge member, in addition to having two spaced-apart conductive strips, also forms a non-straight path between the first main switch section and the second main switch section. The non-straight paths of the strain relieving bridge members allow extra slack and leeway between the first and the second main switch sections of the horn switch, reducing stress on the bridge members. An improved membrane horn switch having a combined bridge member is also provided, and improved membrane horn switches having a combined strain relieving bridge member with a non-straight path are also provided.

20 Claims, 8 Drawing Sheets

HORN MEMBRANE SWITCH WITH RUPTURABLE STRAIN RELIEF BRIDGING CONNECTOR

FIELD OF THE INVENTION

The present invention relates to a membrane horn switch for use in a driver side airbag module, and more specifically, the present invention relates to a membrane horn switch having an improved strain relieving bridge member.

BACKGROUND OF THE INVENTION

This invention relates to a membrane horn switch for a driver side airbag module. A membrane horn switch generally includes a first very thin, flexible, plastic sheet having a conductive coating, and a second very thin, flexible, plastic sheet having a conductive coating. The two plastic sheets are adhered together with the conductive coatings facing and separated by thin nonconductive spacers. Pressure on the membrane horn switch pushes the conductive coatings together to close a horn control circuit that the membrane horn switch is connected to in order to actuate a remote horn.

An airbag module is employed in a vehicle for protecting an occupant against injury by deploying an inflated airbag cushion to physically restrain the occupant's body when the vehicle encounters a collision. A driver side airbag module is normally positioned within a hub of a steering wheel, where a horn switch is also traditionally positioned. Driver side airbag modules have, therefore, been adapted to include a horn switch.

In many driver side airbag modules an inflating airbag cushion is forced out of the airbag module in a predetermined manner through a weakened area or tear seam dividing a horn actuation area of an airbag module cover. Membrane horn switches have been provided with two spaced-apart, rupturable bridge members for spanning the tear seam of the airbag module cover and connecting two larger sections of the horn switch. The rupturable bridge members accommodate the operation of the tear seams while providing the potential for actuation of the horn switch over a larger portion of the horn actuation area of the module cover.

Because the tear seam is normally located at or near the center of the horn actuation area of the airbag module cover, and because the bridge members span the tear seam, the bridge members bend and twist upon a driver pressing upon the horn actuation area. Over the average life of an automobile, the bridge members may be subjected to hundreds or thousands of cycles of bending and twisting. It has been discovered that such bending or twisting can cause failure of the bridge members and render the horn switch inoperable. In particular, once a stress crack forms in the conductive coatings of the bridge members, the stress cracks can propagate and eventually sever the conductive coatings and disable the horn switch. The bridge members must be able to withstand thousands of cycles of bending and twisting during the average life of a vehicle, and there is a need for an improved membrane horn switch having means for preventing the propagation of stress cracks through the conductive coatings of the bridge members.

BRIEF SUMMARY OF THE INVENTION

A general object, therefore, of the present invention is to provide an improved membrane horn switch.

A more specific object of the present invention is to provide an improved membrane horn switch having bridge members that are better able to withstand thousands of cycles of bending and twisting without failure of the bridge members and the membrane horn switch.

Another object of the present invention is to provide an improved membrane horn switch having bridge members that are more resistant to the propagation of stress cracks through the conductive coatings of the bridge members.

An additional object of the present invention is to provide an improved membrane horn switch having bridge members configured to reduce tension across the bridge members.

A further object of the present invention is to provide an improved membrane horn switch having only one bridge member.

The present invention meets these objects by providing a membrane horn switch having a first main switch section and a second main switch section connected by a first bridge member and a second bridge member. The first and the second bridge members are relatively narrow and rupturable by a force created by an inflating airbag cushion. Each of the first and the second bridge members includes an electrically conductive coating in the form of at least two spaced-apart, generally parallel strips connecting conductive coatings of the first and the second main switch sections. The electrically conductive coatings in the form of at least two spaced-apart, generally parallel strips prevent the propagation of stress cracks across the conductive coatings and provide redundancy, resulting in an increase in the useful life of the bridge members and in-turn the life of the horn switch.

According to one aspect of the present invention, the first bridge member and the second bridge member are spaced-apart, and each bridge member defines a non-straight path between the first main switch section and the second main switch section. The non-straight path of the bridge members provides reduced tension across the bridge members and a greater range of movement to reduce the resulting stress on the bridge members during the bending and twisting of horn actuation. The non-straight path of the bridge members, therefore, increases the useful life of the bridge members and in-turn the horn switch.

According to another aspect of the present invention, the first bridge member is superimposed on the second bridge member forming a combined bridge member. The at least two conductive strips of the first bridge member are offset from the at least two conductive strips of the second bridge member so that the at least two conductive strips of the first bridge member do not contact the at least two conductive strips of the second bridge member. The combined bridge member can be beneficial in place of two spaced-apart bridge members for at least two reasons. First, the combined bridge member places fewer design restrictions on a module cover that the horn switch is to be mounted to. Second, an inflating airbag cushion has to break through only one bridge member instead of two bridge members.

According to an additional aspect of the present invention, the combined bridge member defines a non-straight path between the first main switch section and the second main switch section in order to reduce tension and stress on the combined bridge member.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
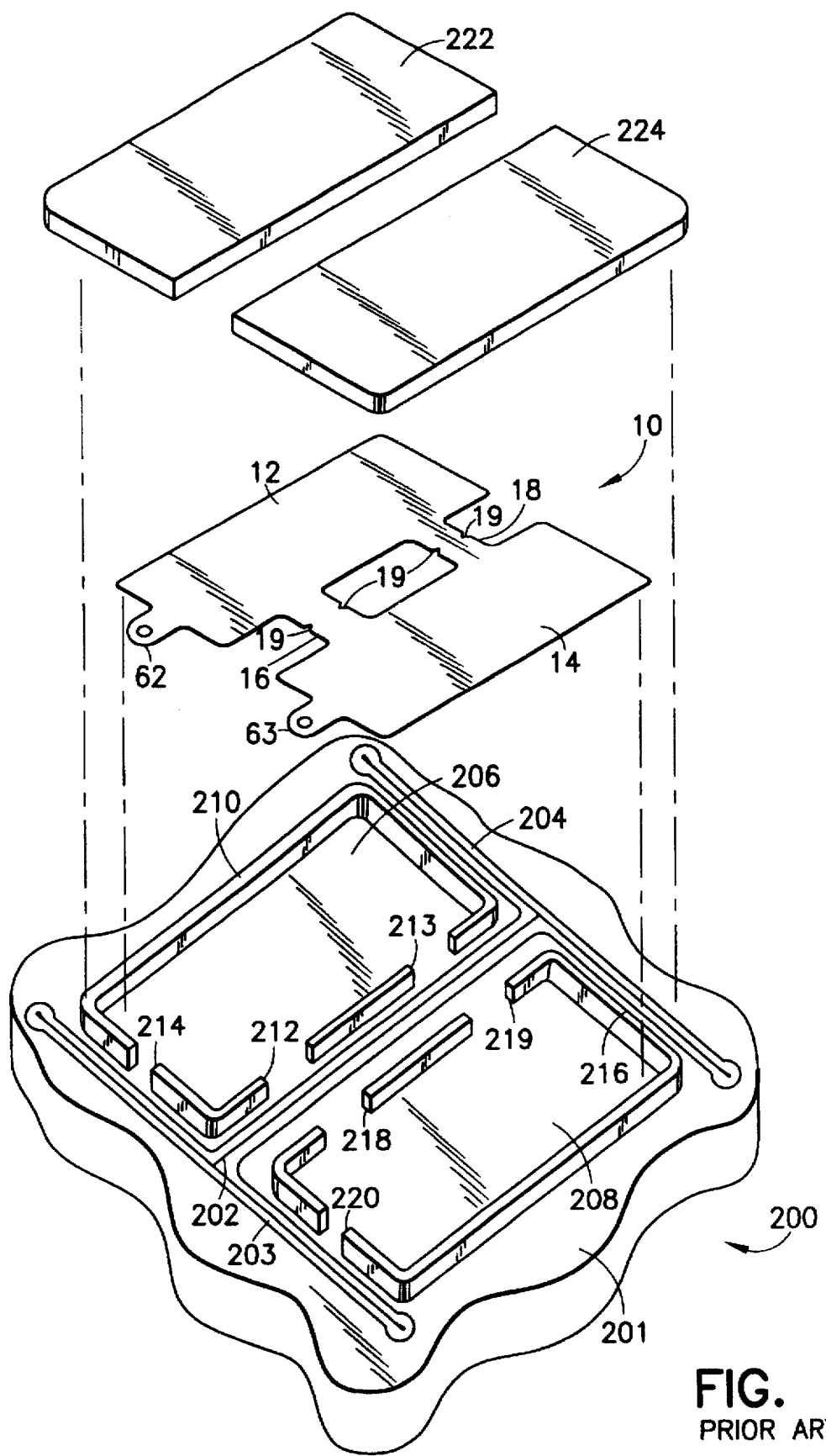
FIG. 1 is an exploded, perspective view of a portion of an airbag module cover with a prior art membrane horn switch.
Figure 2:
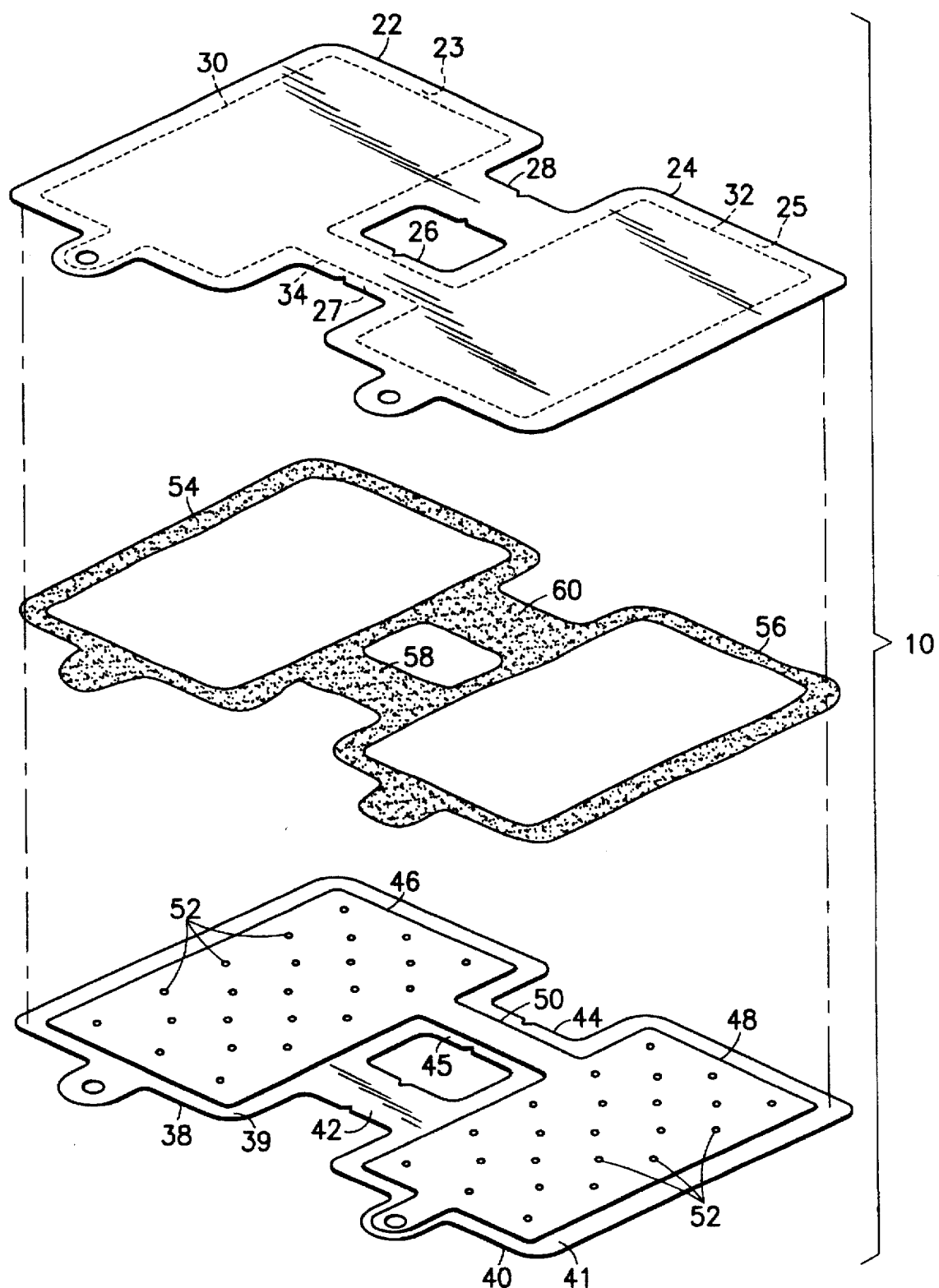
FIG. 2 is an exploded perspective view of the prior art membrane horn switch of FIG. 1.
Figure 5:
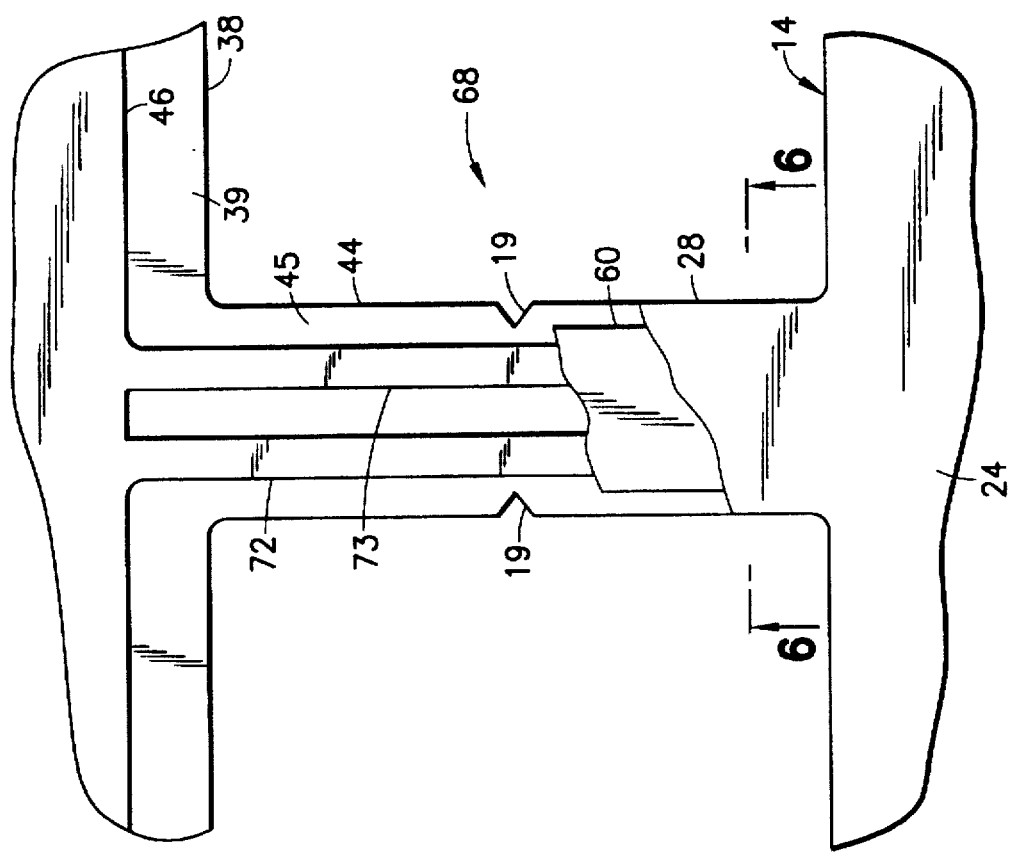
FIG. 5 is an enlarged plan view, partially cut-away, of an improved bridge member of the membrane horn switch.
Figure 3:
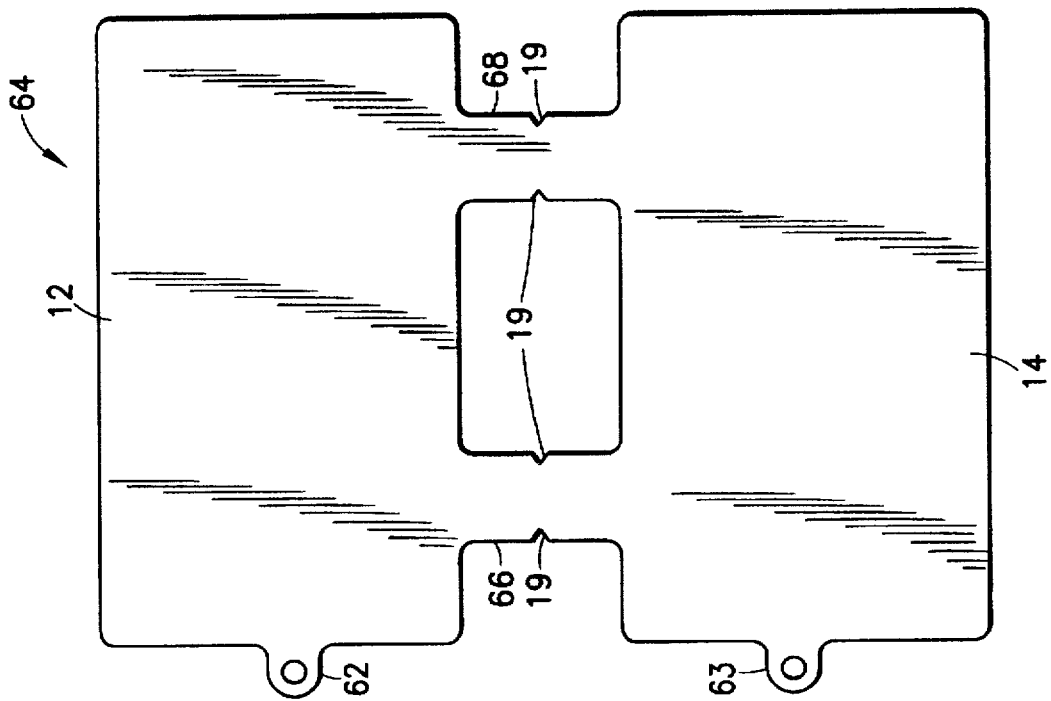
FIG. 3 is a plan view of a membrane horn switch according to the present invention.
Figure 4:
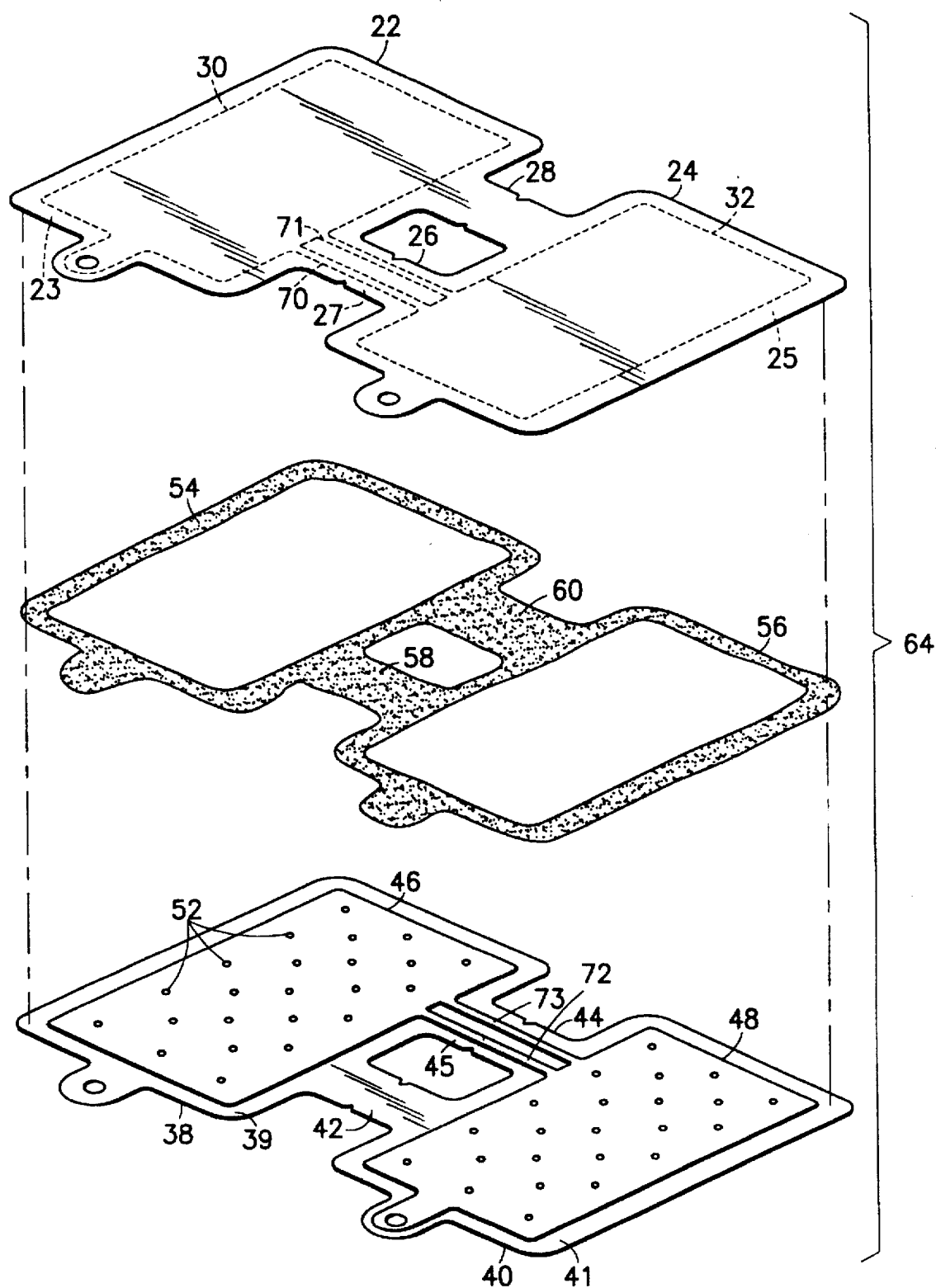
FIG. 4 is an exploded perspective view of the membrane horn switch of FIG. 3.

Referring to FIGS. 3 through 6, the present invention provides a membrane horn switch 64 having improved bridge members 66,68. Referring first, however, to FIGS. 1 and 2, a prior art membrane horn switch 10 is shown to provide background for the illustration of the improvements provided by the present invention. As shown in FIG. 1, the prior art membrane horn switch 10, which is connectable to a remote power source and a remote vehicle horn as part of horn control circuit, is mounted to a module cover 200 for use as part of a driver side airbag module. As is known in the art, the membrane horn switch 10 acts to close the horn circuit and activate the remote horn upon being compressed by a vehicle driver.

The membrane horn switch 10 includes rectangular, relatively large first and second main switch sections 12,14 connected by relatively small, i.e. narrowed, spaced-apart first and second bridge members 16,18. The relatively narrow first and second bridge members 16,18 provide readily rupturable areas for a force produced by an inflating airbag, and each bridge member is provided with one or more and preferably at least two opposing notches 19 which enhance the ability of the bridge members to rupture during airbag deployment.

Referring also to FIG. 2, the first main switch section 12 includes a flat, thin and flexible top nonconductive sheet 22 having a bottom surface 23 substantially covered with an electrically conductive coating 30, and a flat, thin and flexible bottom nonconductive sheet 38 having a top surface 39 substantially covered with an electrically conductive coating 46. The top and the bottom nonconductive sheets 22,38 of the first main switch section 12 are overlaid, with the conductive coatings 30,46 facing each other, and are held together with a layer of adhesive 54 extending around the periphery of the conductive coatings 30,46. The first main switch section 12 also includes a nonconductive spacer in the form of a plurality of spaced-apart, plastic raised protrusions 52 arranged on and facing upwardly from the conductive coating 46 on the bottom nonconductive sheet 38. The plurality of raised protrusions 52 prevent contact of the conductive coatings 30,46 until sufficient actuation pressure is exerted against the of the first main switch section 12. Raised protrusions can additionally or alternatively be arranged on and facing downwardly from the conductive coating 30 on the top nonconductive sheet 22.

The second main switch section 14 includes a flat, thin and flexible top nonconductive sheet 24 having a bottom surface 25 substantially covered with an electrically conductive coating 32, and a flat, thin and flexible bottom nonconductive sheet 40 having a top surface 41 substantially covered with an electrically conductive coating 48. The top 24 and the bottom nonconductive sheets 40 of the second main switch section 14 are overlaid, with the conductive coatings 32,48 facing each other, and are held together with a layer of adhesive 56 extending around the periphery of the conductive coatings 32,48. The second main switch section 14 also includes a nonconductive spacer in the form of a plurality of spaced-apart, plastic raised protrusions 52 arranged on and facing upwardly from the conductive coating 48 on the bottom nonconductive sheet 40. The plurality of raised protrusions 52 prevent contact of the conductive coatings 32,48 until sufficient actuation pressure is exerted against the second main switch section 14. Raised protrusions can additionally or alternatively be arranged on and facing downwardly from the conductive coating 32 on the top nonconductive sheet 24.

The first bridge member 16 includes a flat, thin and flexible top nonconductive bridge sheet 26 having a bottom surface 27 substantially covered with a conductive coating 34, and a flat, thin and flexible bottom nonconductive bridge sheet 42. The top and the bottom nonconductive bridge sheets 26,42 of the first bridge member 16 are overlaid, with the conductive coating 34 therebetween, and secured together with a layer of adhesive 58. The top nonconductive bridge sheet 26 connects the top nonconductive sheet 22 of the first main switch section 12 to the top nonconductive sheet 24 of the second main switch section 14 and the conductive coating 34 connects the conductive coating 30 on the top nonconductive sheet 22 of the first main switch section 12 to the conductive coating 32 on the top conductive sheet 24 of the second main switch section 14. The bottom nonconductive bridge sheet 42 connects the bottom nonconductive sheet 38 of the first main switch section 12 to the bottom nonconductive sheet 40 of the second main switch section 14.

The second bridge member 18 includes a flat, thin and flexible bottom nonconductive bridge sheet 44 having a top surface 45 substantially covered by a conductive coating 50, and a flat, thin and flexible top nonconductive bridge sheet 28. The top and the bottom nonconductive bridge sheets 28,44 of the second bridge member 18 are overlaid, with the conductive coating 50 therebetween, and secured together with a layer of adhesive 60. The top nonconductive bridge sheet 28 connects the top nonconductive sheet 22 of the first main switch section 12 to the top nonconductive sheet 24 of the second main switch section 14. The bottom nonconductive bridge sheet 44 connects the bottom nonconductive sheet 38 of the first main switch section 12 to the bottom nonconductive sheet 40 of the second main switch section 14, and the conductive coating 50 connects the conductive coating 46 on the bottom nonconductive sheet 38 of the first main switch section 12 to the conductive coating 48 on the bottom nonconductive sheet 40 of the second main switch section 14. Each of the nonconductive sheets of the horn switch 10 can be made from a suitable material such as polyethylene or polyester, and each of the conductive coatings of the horn switch can be made from a suitable material such as copper, silver or conductive ink which can be screened on the nonconductive sheets.

Referring back to FIG. 1, an inner surface 201 of the module cover 200 defines a central tear seam 202 extending between two opposed side tear seams 203,204, and the tear seams form first and second airbag deployment doors 206, 208. The module cover 200 also includes a first raised ridge 210 substantially extending around the first deployment door 206, and a second raised ridge 216 substantially extending around the second deployment door 208.

As shown, the membrane horn switch 10 is positioned against the module cover 200, with the first main switch section 12 positioned against the first deployment door 206 and peripherally surrounded by the first raised ridge 210, and the second main switch section 14 positioned against the second deployment door 208 and peripherally surrounded by the second raised ridge 216. The first and the second bridge members 16,18 extend through a first and second opening 212,213 in the first raised ridge 210 and a first and second opening 218,219 in the second raised ridge 216 and transverse the central tear seam 202 formed in the module cover 200. A first lead 62 of the membrane horn switch 10 extends through an opening 214 in the first raised ridge 210 and a second lead 63 extends through an opening 220 in the second raised ridge 216. The leads 62,63 are connectable to a vehicle horn control circuit. Two rigid backing plates 222,224 are secured inside the first and the second raised ridges 210,216 to contain the membrane horn switch 10 against the module cover. Depression of the airbag module cover 200 by a vehicle driver compresses the membrane horn switch 10 against the rigid backing plates 222,224 to activate a remote horn.

Whenever the module cover 200 is depressed, however, the first and the second bridge members 16,18 are bent and flexed, causing unwanted stress in the bridge members. The bending and flexing of the bridge members 16,18 over hundreds of cycles of horn actuation can lead to cracks forming in the conductive coatings 34,50 of the bridge members. Once a stress crack forms in one of the conductive coatings 34,50 of the bridge members 16,18, the crack can continue to spread essentially unimpeded to sever the conductive coating, requiring the replacement of the membrane horn switch 10. Replacement of the membrane horn switch 10 is especially unwanted since the entire module cover 200 might have to be replaced, depending upon whether the backing plates 222,224 are welded to the raised ridges 210,216. The unwanted stress can also be intensified since, as shown, each of the bridge members 16,18 forms a straight line between the first and the second main switch sections 12,14, which can additionally place the bridge members in tension.

Referring to FIGS. 3 through 6, the membrane horn switch 64 according to the present invention includes improved first and second bridge members 66,68 which are resistant to the propagation of stress cracks. The membrane horn switch 64 is similar to the prior art horn switch 10 of FIGS and 2, and parts which are the same have the same reference numeral. As shown, the first improved bridge member 66 includes an electrically conductive coating in the form of two (2) spaced-apart, parallel strips 70,71 on the bottom surface 27 of the top nonconductive bridge sheet 26, with each strip extending between the electrically conductive coatings 30,32 on the top nonconductive sheets 22,24 of the first and the second main switch sections 12,14. The second improved bridge member 68 also includes an electrically conductive coating in the form of two (2) spaced-apart, parallel strips 72,73 on the top surface 45 of the bottom nonconductive bridge sheet 44, with each strip extending between the electrically conductive coatings 46,48 on the bottom nonconductive sheets 38,40 of the first and the second main switch sections 12,14.

Figure 6:
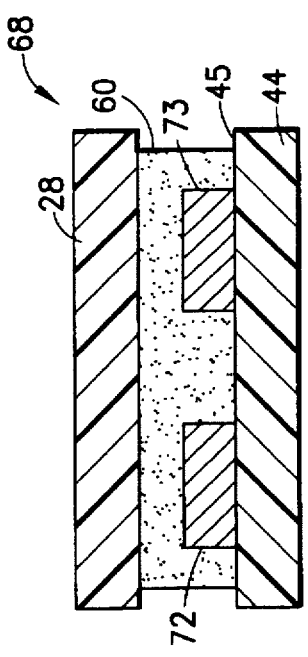
FIG. 6 is an enlarged sectional view of the improved bridge member taken along the line 6—6 of FIG. 5.

The two spaced-apart strips 70,71 of conductive coating of the first improved bridge member 66, and the two spaced-apart strips 72,73 of conductive coating of the second improved bridge member 68 prevent the propagation of stress cracks across the entire conductive coating of each bridge member. Even if one of the two strips 70,71 of conductive coating of the first improved bridge member 66, or one of the two strips 72,73 of conductive coating of the second improved bridge member 68 is severed by a stress crack, the crack will not continue across the other of the two strips. In addition, depending on the conductive material used to form the strips, each strip is suitably wide and thick enough to individually handle the electrical load (of about 100 to 500 milliamperes for example) that passes through the horn switch 64. The two strips 70,71 of conductive coating of the first improved bridge member 66, and the two strips 72,73 of conductive coating of the second improved bridge member 68, therefore, provide redundancy in addition to preventing stress cracks, resulting in an increase in the useful life of the bridge members and in-turn the life of the horn switch 64. Each improved bridge member 66,68 can have more than two spaced-apart conductive strips. As shown in FIG. 6, the layer of nonconductive adhesive 60 securing the top nonconductive bridge sheet 28 to the bottom nonconductive bridge sheet 44 of the second improved bridge member 68 preferably fills in between the two strips 72,73 of conductive coating to further prevent propagation of stress cracks. Although not shown, the layer of nonconductive adhesive 58 securing the top nonconductive bridge sheet 26 to the bottom nonconductive bridge sheet 42 of the first improved bridge member 66 also fills in between the two strips 70,71 of conductive coating.

Figure 7:
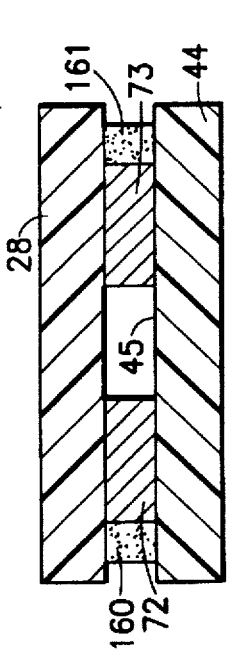
FIG. 7 is an enlarged sectional view of another improved bridge member.
Figure 8:
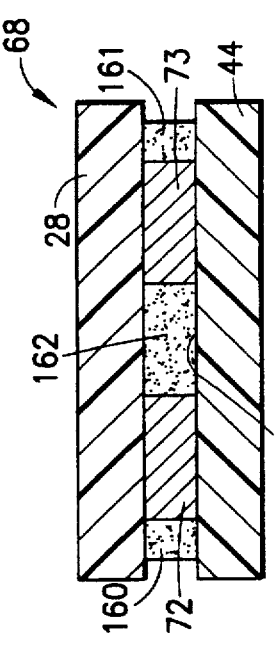
FIG. 8 is an enlarged sectional view of an additional improved bridge member.

As shown in FIG. 7, as an alternative to the layer of nonconductive adhesive 60, the second improved bridge member 68 (and also the first improved bridge member 66) can include two strips 160,161 of adhesive securing the outer peripheries of the top nonconductive bridge sheet 2S to the outer peripheries of the bottom nonconductive bridge sheet 44 with the strips 70,71 of conductive coating positioned between the two strips 160,161 of adhesive. As shown in FIG. 8 the second improved bridge member 68 (and also the first improved bridge member 66) can further include a strip 162 of adhesive positioned between the two strips 72,73 of conductive coating. If each improved bridge member 66,68 has more than two spaced-apart conductive strips, the bridge members can include further strips of adhesive positioned between some or all of the additional strips of conductive coating.

Figure 9:
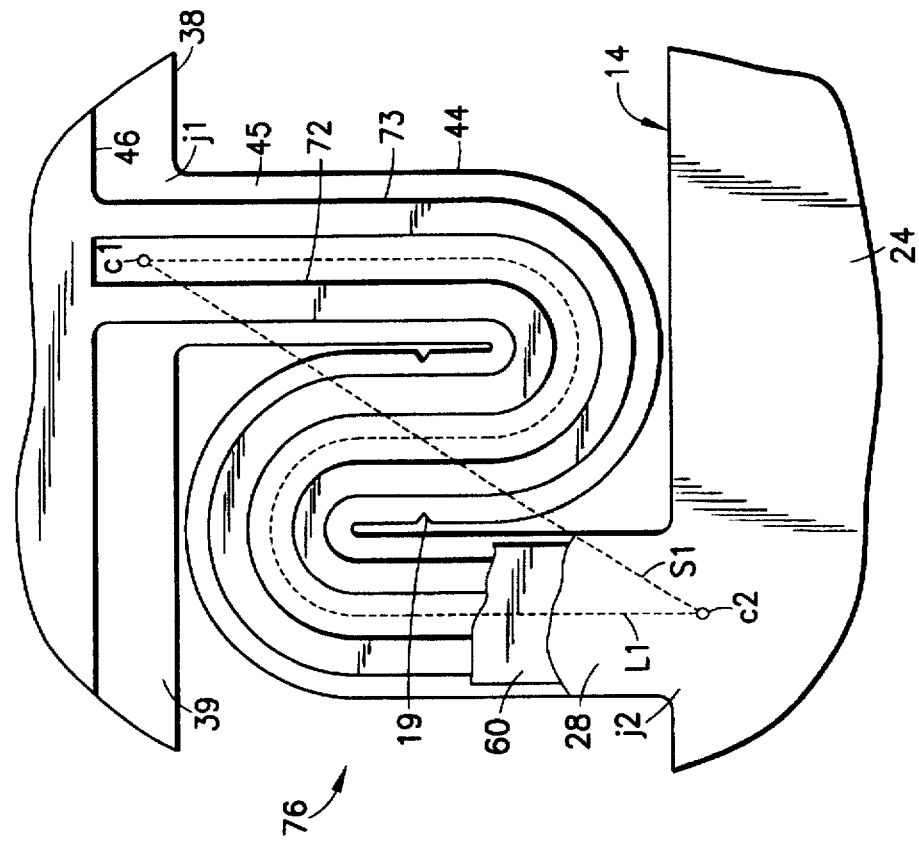
FIG. 9 is an enlarged plan view, partially cut-away, of an improved strain relieving bridge member according to the present invention.
Figure 11:
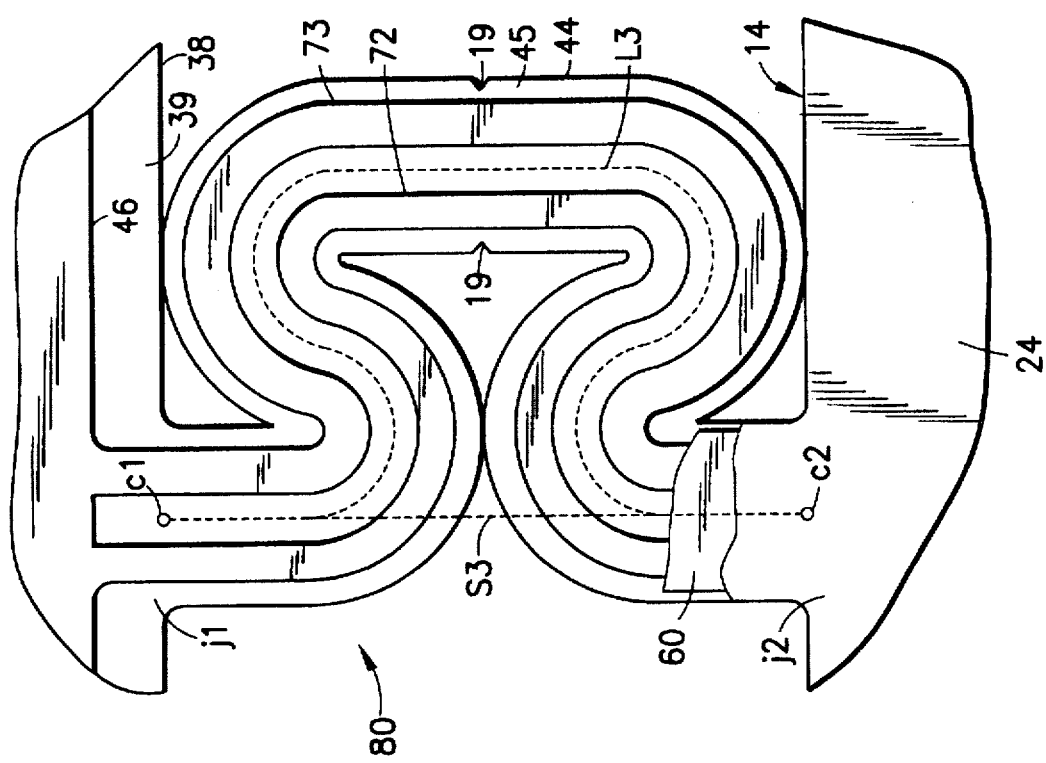
FIG. 11 is an enlarged plan view, partially cut-away, of an additional improved strain relieving bridge member according to the present invention.
Figure 10:
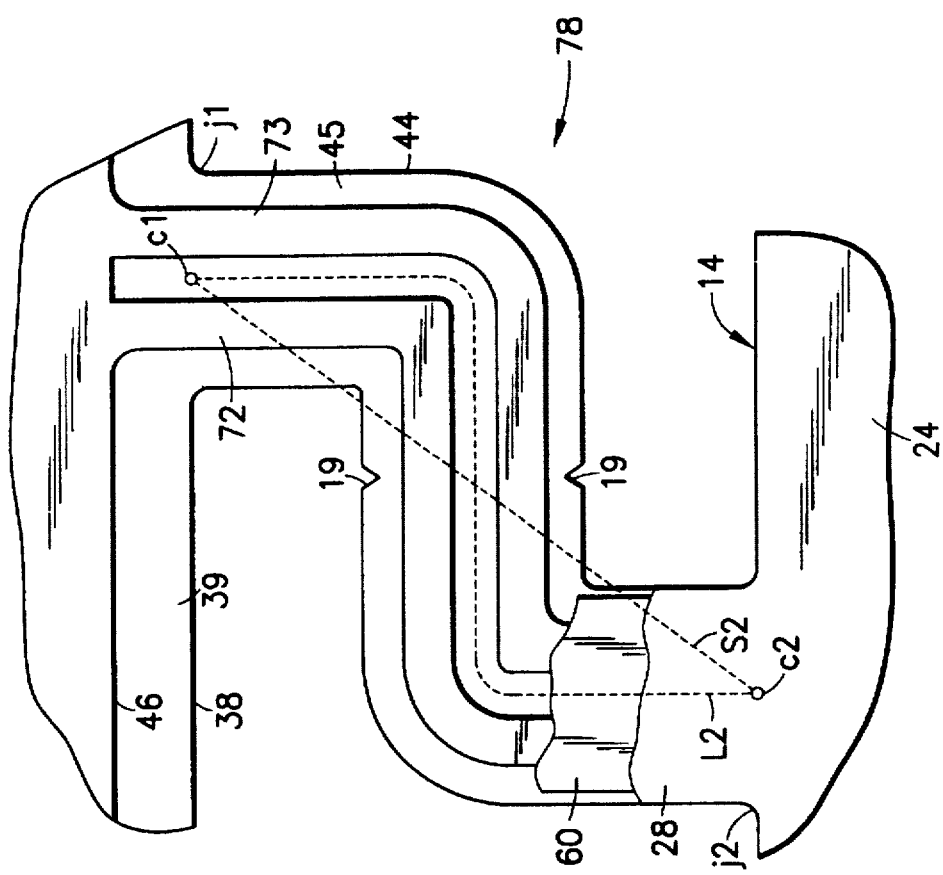
FIG. 10 is an enlarged plan view, partially cut-away, of another improved strain relieving bridge member according to the present invention.

Referring to FIG. 9 through 11, improved, strain relieving bridge members 76,78,80 according to the present invention are shown in place of the second improved bridge member 68 of FIGS.3 through 6. The bridge members 76,78,80 are similar to the second improved bridge member 68 of FIGS.

3 through 6, and parts which are the same have the same reference numeral. Although not shown, similar improved strain relieving bridge members are also provided in place of the first improved bridge member 66 of FIGS. 3 through 6.

In addition to being resistant to the propagation of stress cracks, the improved, strain relieving bridge members 76,78, 80 have non-straight paths between the first and the second main switch sections 12,14, and the non-straight paths reduce tension and compression across the bridge members. As shown, the bridge members 76,78,80 each have a first juncture j1 with the first main switch section 12 and a second juncture j2 with the second main switch section 14. Each bridge member 76,78,80 has, respectively, an overall length L1,L2,L3 between a central point c1 of the first juncture j1 and a central point c2 of the second juncture j2 that is greater than the length of an imaginary straight line S1,S2,S3 between the central point of the first juncture and the central point of the second juncture.

The first juncture j1 of the bridge member 76 of FIG. 9 is offset from the second juncture j2 of the bridge member, and the bridge member has a serpentine path generally in the form of an "S" between the first juncture and the second juncture. The first juncture j1 of the bridge member 78 of FIG. 8 is offset from the second juncture j2 of the bridge member, and the bridge member has a serpentine path generally in the form of a "Z" between the first juncture and the second juncture. The first juncture j1 of the bridge member 80 of FIG. 11 is aligned with the second juncture j2 of the bridge member, and the bridge member has a serpentine path generally in the form of an omega between the first juncture and the second juncture.

The non-straight paths of the improved strain relieving bridge members 76,78,80 allow extra slack and leeway between the first and the second main switch sections 12,14 of the horn switch, thereby reducing tension and compression across the bridge members. The non-straight paths also provide a greater freedom of movement for the bridge members 76,78,80, thereby allowing easier bending and twisting. This reduced tension and compression, and greater freedom of movement, in combination, reduces the resulting stress on the bridge members 76,78,80 during the bending and twisting of horn actuation. The non-straight paths of the bridge members 76,78,80, therefore, increase the useful life of the bridge members and in-turn the life of the horn switches. It should be noted that improved strain relieving bridge members can be provided having paths forming sharp angles such as a "V" for example, although paths forming curved turns are preferred to reduce tension. Also improved strain relieving bridge members can be provided having non-straight paths in the form of shapes other than an omega, "S" or "Z".

Figure 12:
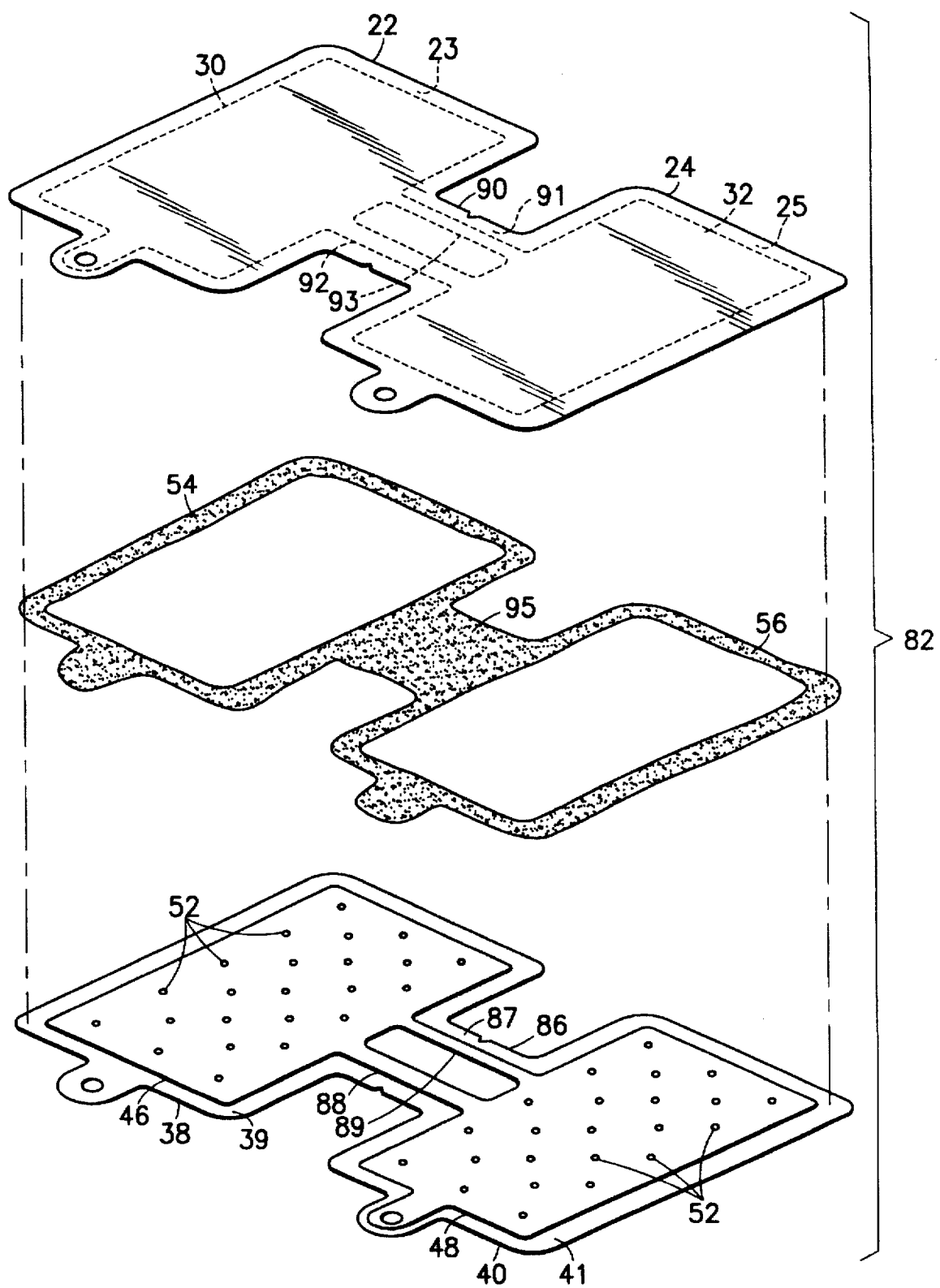
FIG. 12 is an exploded perspective view of another membrane horn switch according to the present invention.
Figure 14:
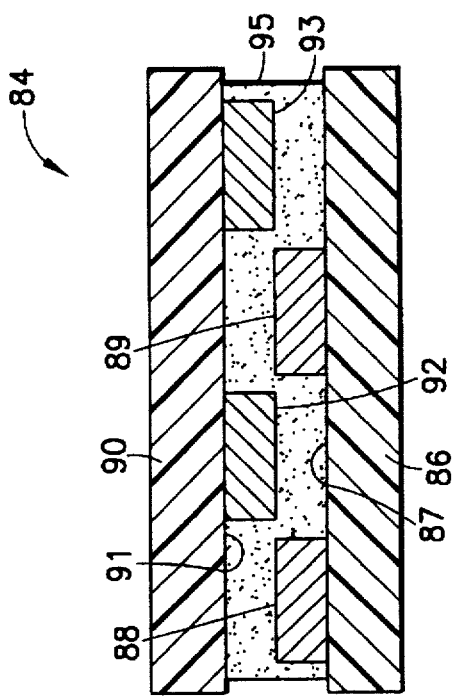
FIG. 14 is an enlarged sectional view of a combined bridge member of the membrane horn switch taken along the line 14—14 of FIG. 13.
Figure 13:
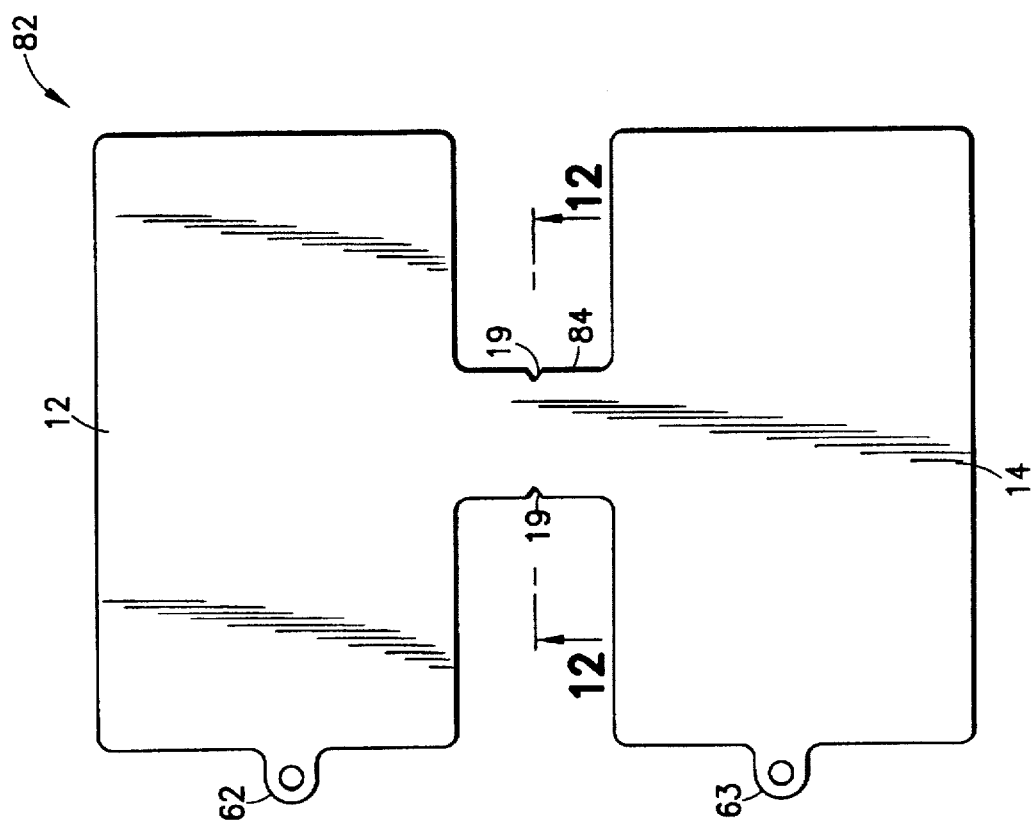
FIG. 13 is a plan view of the membrane horn switch of FIG. 11.

Referring to FIGS. 12 through 14, an additional membrane horn switch 82 according to the present invention is shown and includes a combined, improved bridge member 84. The horn switch 82 is similar to the prior art horn switch 10 of FIGS. 1 and 2, and parts which are the same have the same reference numeral. The combined, improved bridge member 84 basically combines two spaced-apart bridge members into superimposed bridge members. The membrane horn switch 82 having the combined bridge member 84 in place of two spaced-apart bridge members is beneficial, for example, because the first and the second raised ridges 210,216 of the module cover 200 (see FIG. 1) each need only one opening for the bridge member instead of two. The design of the module cover 200, therefore, is less restricted. In addition, an inflating airbag cushion only has to break through a single bridge member instead of two spaced-apart bridge members.

The combined, improved bridge member 84 includes a bottom nonconductive bridge sheet 86 connecting the bottom nonconductive sheets 38,40 of the first and the second main switch sections 12,14. The bottom nonconductive bridge sheet 86 has a top surface 87 covered with a conductive coating in the form of two (2) spaced-apart, parallel strips 88,89 extending between the conductive coatings 46,48 on the bottom nonconductive sheets 38,40 of the first and the second main switch sections 12,14. The combined bridge member 84 also includes a top nonconductive bridge sheet 90 connecting the top nonconductive sheets 22,24 of the first and the second main switch sections 12,14. The top nonconductive bridge sheet 90 has a bottom surface 91 covered with a conductive coating in the form of two (2) spaced-apart, parallel strips 92,93 extending between the conductive coatings 30,32 on the top nonconductive sheets 22,24 of the first and the second main switch sections 12,14. The top and the bottom nonconductive bridge sheets 86,90 are superimposed and secured with a layer 95 of nonconductive adhesive to form the combined bridge member 84, and the two conductive strips 92,93 on the top nonconductive bridge sheet 90 are offset from the two conductive strips 88,89 on the bottom nonconductive bridge sheet 86.

Because the two conductive strips 92,93 on the top nonconductive bridge sheet 90 are offset from the two conductive strips 88,89 on the bottom nonconductive bridge sheet 86, the top and the bottom nonconductive bridge sheets can be superimposed without the risk of the conductive strips on the bottom nonconductive sheet contacting the conductive strips on the top nonconductive sheet to inadvertently actuate the horn switch 82 prior to the first or the second main switch sections 12,14 being compressed. Referring to FIG. 14, the layer 95 of nonconductive adhesive acts as a nonconductive spacer between the conductive strips 88,89 on the bottom nonconductive bridge sheet 86 and the conductive strips 92,93 on the top nonconductive bridge sheet 90, to prevent contact and inhibit the propagation of stress cracks among the conductive strips.

It should be noted that the combined, improved bridge member 84 could include, in place of the layer 95 of adhesive, two strips of adhesive positioned on either side of the four strips 88,89,92,93 of conductive coating, or five strips of adhesive positioned on either side and in between the four strips of conductive coating similar to the bridge member of FIGS. 7 and 8. Also, each of the top nonconductive bridge sheet 90 and the bottom nonconductive bridge sheet 86 can have more than two spaced-apart conductive strips. In addition, the combined improved bridge member 84 can be made with a non-straight path similar to the improved, strain relieving bridge members 76,78,80 of FIGS. 9 through 11, in order to reduce stress on the bridge member.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A membrane horn switch comprising:
   A) a first main switch section including,
      1) a top nonconductive sheet having a bottom surface substantially covered with an electrically conductive coating,
      2) a bottom nonconductive sheet having a top surface substantially covered with an electrically conductive coating, with the top nonconductive sheet superimposed on the bottom nonconductive sheet with the electrically conductive coatings facing each other, and 3) at least one nonconductive spacer separating the conductive coatings until sufficient actuation pressure is exerted against the first main switch section;

B) a second main switch section including,
1) a top nonconductive sheet having a bottom surface substantially covered with an electrically conductive coating,
2) a bottom nonconductive sheet having a top surface substantially covered with an electrically conductive coating, with the top nonconductive sheet superimposed on the bottom nonconductive sheet with the electrically conductive coatings facing each other, and
3) at least one nonconductive spacer separating the conductive coatings until sufficient actuation pressure is exerted against the second main switch section;

C) a first bridge member including,
1) a top nonconductive bridge sheet connecting the top nonconductive sheets of the first and the second main switch sections, the top nonconductive bridge sheet having a bottom surface, and
2) an electrically conductive coating in the form of at least two spaced-apart, generally parallel strips substantially covering the bottom surface of the top nonconductive bridge sheet and connecting the conductive coatings on the top nonconductive sheets of the first and the second main switch sections, the first bridge member being relatively narrow and rupturable by a force created by an inflating airbag cushion; and D) a second bridge member including,
1) a bottom nonconductive bridge sheet connecting the bottom nonconductive sheets of the first and the second main switch sections, the bottom nonconductive bridge sheet having a top surface, and
2) an electrically conductive coating in the form of at least two spaced-apart, generally parallel strips substantially covering the top surface of the bottom nonconductive bridge sheet and connecting the conductive coatings on the bottom nonconductive sheets of the first and the second main switch sections, the second bridge member being relatively narrow and rupturable by a force created by an inflating airbag cushion.

2. A membrane horn switch according to claim 1 wherein the first bridge member and the second bridge member are spaced-apart.

3. A membrane horn switch according to claim 2 wherein:
the first bridge member also includes a bottom nonconductive bridge sheet connecting the bottom nonconductive sheets of the first and the second main switch sections, with said bottom nonconductive bridge sheet being superimposed on the at least two conductive strips on the top nonconductive bridge sheet of the first bridge member; and
the second bridge member includes a top nonconductive bridge sheet connecting the top nonconductive sheets of the first and the second main switch sections, with said top nonconductive bridge sheet being superimposed on the at least two conductive strips on the bottom nonconductive bridge sheet of the second bridge member.

4. A membrane horn switch according to claim 3 wherein:
the first bridge member further includes a layer of adhesive between the bottom nonconductive bridge sheet of the first bridge member and the at least two conductive strips of the first bridge member, with the layer of adhesive being between the at least two conductive strips of the first bridge member; and
the second bridge member further includes a layer of adhesive between the top nonconductive bridge sheet of the second bridge member and the at least two conductive strips of the second bridge member, with the layer of adhesive being between the at least two conductive strips of the second bridge member.

5. A membrane horn switch according to claim 1 wherein the first and the second bridge members each define a non-straight path between the first main switch section and the second main switch section.

6. A membrane horn switch according to claim 5 wherein the first and the second bridge members each define a serpentine path.

7. A membrane horn switch according to claim 6 wherein the first and the second bridge members each define a serpentine path generally in the form of an omega.

8. A membrane horn switch according to claim 6 wherein the first and the second bridge members each define a serpentine path generally in the form of an "S".

9. A membrane horn switch according to claim 6 wherein the first and the second bridge members each define a serpentine path generally in the form of a "Z".

10. A membrane horn switch according to claim 1 wherein:
the first bridge member has a first juncture with the first main switch section and a second juncture with the second main switch section, with the first bridge member having an overall length between a central point of the first juncture and a central point of the second juncture that is at least greater than an imaginary straight line between the central point of the first juncture and the central point of the second juncture; and
the second bridge member has a first juncture with the first main switch section and a second juncture with the second main switch section, with the second bridge member having an overall length between a central point of said first juncture and a central point of said second juncture that is at least greater than an imaginary straight line between the central point of the first juncture and the central point of the second juncture.

11. A membrane horn switch according to claim 1 wherein the first bridge member is superimposed on the second bridge member forming a combined bridge member, with the at least two conductive strips of the first bridge member offset from the at least two conductive strips of the second bridge member so that the at least two conductive strips of the first bridge member do not contact the at least two conductive strips of the second bridge member.

12. A membrane horn switch according to claim 11 wherein the combined bridge member also includes a nonconductive divider positioned between the at least two conductive strips of the first bridge member and the at least two conductive strips of the second bridge member.

13. A membrane horn switch according to claim 12 wherein the nonconductive divider comprises a layer of adhesive, with the layer of adhesive being between the at least two conductive strips of the first bridge member and being between the at least two conductive strips of the second bridge member.

14. A membrane horn switch according to claim 11 wherein the combined bridge member has a non-straight path between the first main switch section and the second main switch section.

15. A membrane horn switch according to claim 14 wherein the combined bridge member defines a serpentine path generally in the form of an omega.

16. A membrane horn switch according to claim 14 wherein the combined bridge member defines a serpentine path generally in the form of an "S".

17. A membrane horn switch according to claim 14 wherein the combined bridge member defines a serpentine path generally in the form of a "Z".

18. A membrane horn switch according to claim 11 wherein the combined bridge member has a first juncture with the first main switch section and a second juncture with the second main switch section, with the combined bridge member having an overall length between a central point of said first juncture and a central point of said second juncture that is at least greater than an imaginary straight line between the central point of the first juncture and the central point of the second juncture.

19. A membrane horn switch according to claim 1 wherein the first and the second bridge members each define at least one notch.

20. A membrane horn switch according to claim 1 wherein the at least one nonconductive spacer of the first main switch section comprises a plurality of spaced-apart raised protrusions of nonconductive material on the conductive coating on the bottom nonconductive sheet of the first main switch section, and the at least one nonconductive spacer of the second main switch section comprises a plurality of spaced-apart raised protrusions of nonconductive material on the conductive coating on the bottom nonconductive sheet of the second main switch section.

* * * * *